US011256930B2

(12) United States Patent
Yonekawa et al.

(10) Patent No.: US 11,256,930 B2
(45) Date of Patent: Feb. 22, 2022

(54) ROAD SURFACE MANAGEMENT SYSTEM AND ROAD SURFACE MANAGEMENT METHOD THEREOF

(71) Applicants: Kabushiki Kaisha Toshiba, Tokyo (JP); Toshiba Infrastructure Systems & Solutions Corporation, Kawasaki (JP)

(72) Inventors: Yoko Yonekawa, Tokyo (JP); Yuri Kitani, Tokyo (JP); Nobuyuki Kumakura, Kanagawa (JP); Masaki Shiratsuki, Kanagawa (JP); Takahiko Yamazaki, Chiba (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/078,798

(22) Filed: Oct. 23, 2020

(65) Prior Publication Data
US 2021/0124958 A1 Apr. 29, 2021

(30) Foreign Application Priority Data
Oct. 24, 2019 (JP) ............................ JP2019-193764

(51) Int. Cl.
*G06K 9/00* (2006.01)
(52) U.S. Cl.
CPC ............................ *G06K 9/00798* (2013.01)

(58) Field of Classification Search
CPC .......... G06K 9/00798; G06K 9/00805; G06K 9/4604; G08G 1/167
See application file for complete search history.

(56) References Cited

U.S. PATENT DOCUMENTS

| | | | | |
|---|---|---|---|---|
| 9,581,431 | B1 * | 2/2017 | Sieracki | .............. G06K 9/4604 |
| 2002/0001398 | A1 * | 1/2002 | Shimano | ............. G06K 9/6293 |
| | | | | 382/104 |
| 2005/0151843 | A1 * | 7/2005 | Ozaki | ..................... G06F 16/58 |
| | | | | 348/143 |
| 2006/0228000 | A1 * | 10/2006 | Miyajima | ......... G06K 9/00798 |
| | | | | 382/104 |

(Continued)

FOREIGN PATENT DOCUMENTS

| | | | |
|---|---|---|---|
| JP | 2007-114916 A | 5/2007 | |
| JP | 2007-193850 A | 8/2007 | |

(Continued)

*Primary Examiner* — Md K Talukder
(74) *Attorney, Agent, or Firm* — Baker Botts L.L.P.

(57) ABSTRACT

According to one embodiment, a road surface management system inputs image data of road surface and capturing information of each of the image data and registers them. The image data are collected by repeatedly capturing a same route at predetermined distance. The capturing information includes information of a location and time at time of capturing. The system selects old and new images at a same spot from the registered image data, performs an association process, extracts an original image which is an old image at an arbitrary spot and a target image which is a new image associated with the original image unit based on the result of the association process, and outputs the original image and the target image.

9 Claims, 17 Drawing Sheets

(56) References Cited

U.S. PATENT DOCUMENTS

| | | | | |
|---|---|---|---|---|
| 2008/0240573 | A1* | 10/2008 | Nakamura | G01C 21/26 |
| | | | | 382/190 |
| 2009/0245657 | A1 | 10/2009 | Osugi | |
| 2010/0061701 | A1* | 3/2010 | Iwane | G06F 16/78 |
| | | | | 386/241 |
| 2011/0242311 | A1* | 10/2011 | Miyajima | G06K 9/00805 |
| | | | | 348/116 |
| 2011/0242319 | A1* | 10/2011 | Miyajima | G01S 19/48 |
| | | | | 348/148 |
| 2011/0243457 | A1* | 10/2011 | Miyajima | G01C 21/3602 |
| | | | | 382/209 |
| 2011/0246027 | A1* | 10/2011 | Miyajima | G01C 21/3647 |
| | | | | 701/41 |
| 2017/0069090 | A1* | 3/2017 | Okumura | G06K 9/00785 |
| 2018/0060986 | A1* | 3/2018 | Suzuki | G08G 1/09623 |
| 2018/0195973 | A1 | 7/2018 | Yonekawa et al. | |
| 2021/0082143 | A1* | 3/2021 | Lee | G08G 1/16 |
| 2021/0124958 | A1* | 4/2021 | Yonekawa | G06K 9/6201 |

FOREIGN PATENT DOCUMENTS

| | | | |
|---|---|---|---|
| JP | 2008-165331 | A | 7/2008 |
| JP | 2009-251667 | A | 10/2009 |
| JP | 4773794 | B2 | 9/2011 |
| JP | 2011-215052 | A | 10/2011 |
| JP | 2016-110210 | A | 6/2016 |
| WO | 2017/014288 | A1 | 1/2017 |

\* cited by examiner

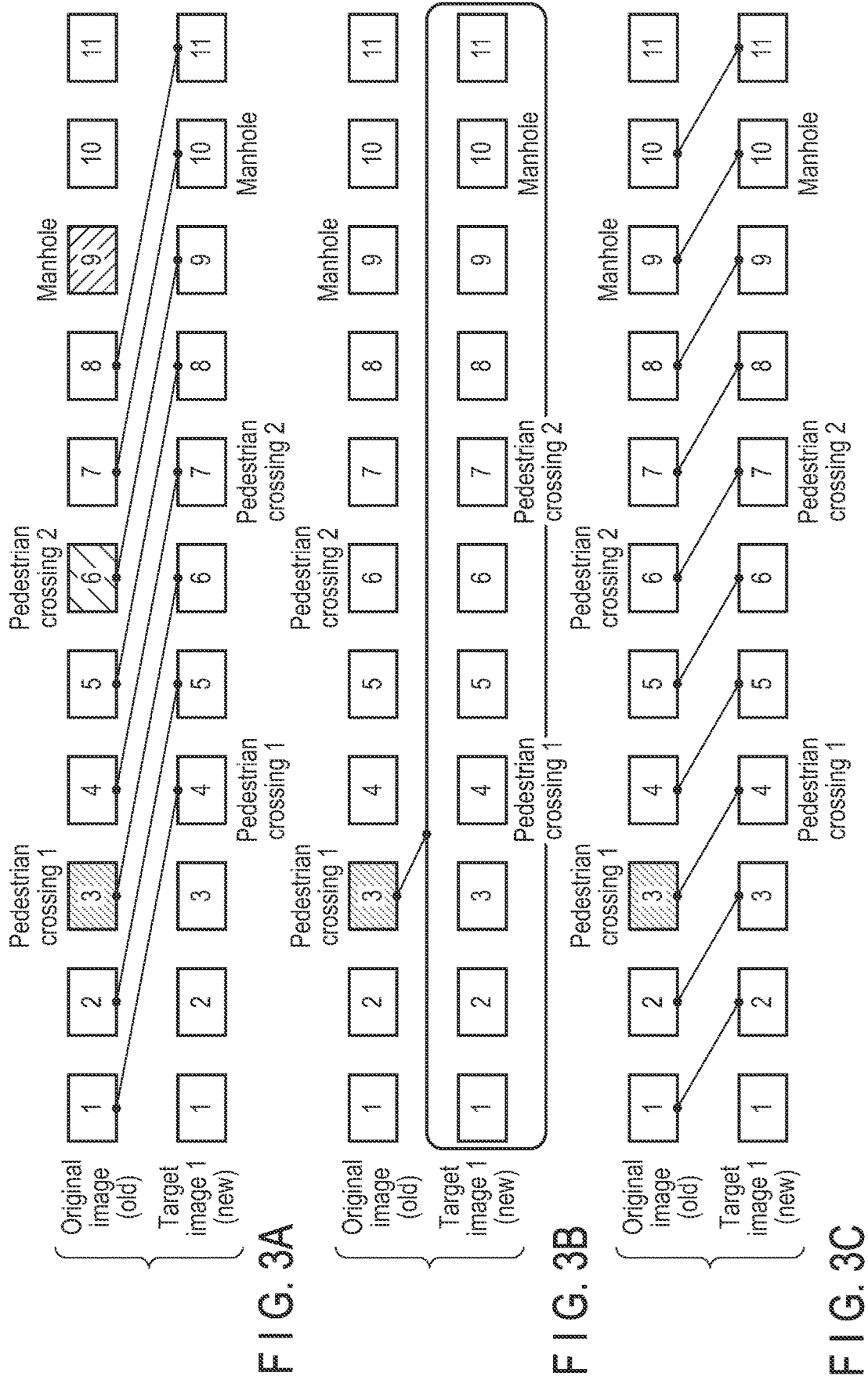

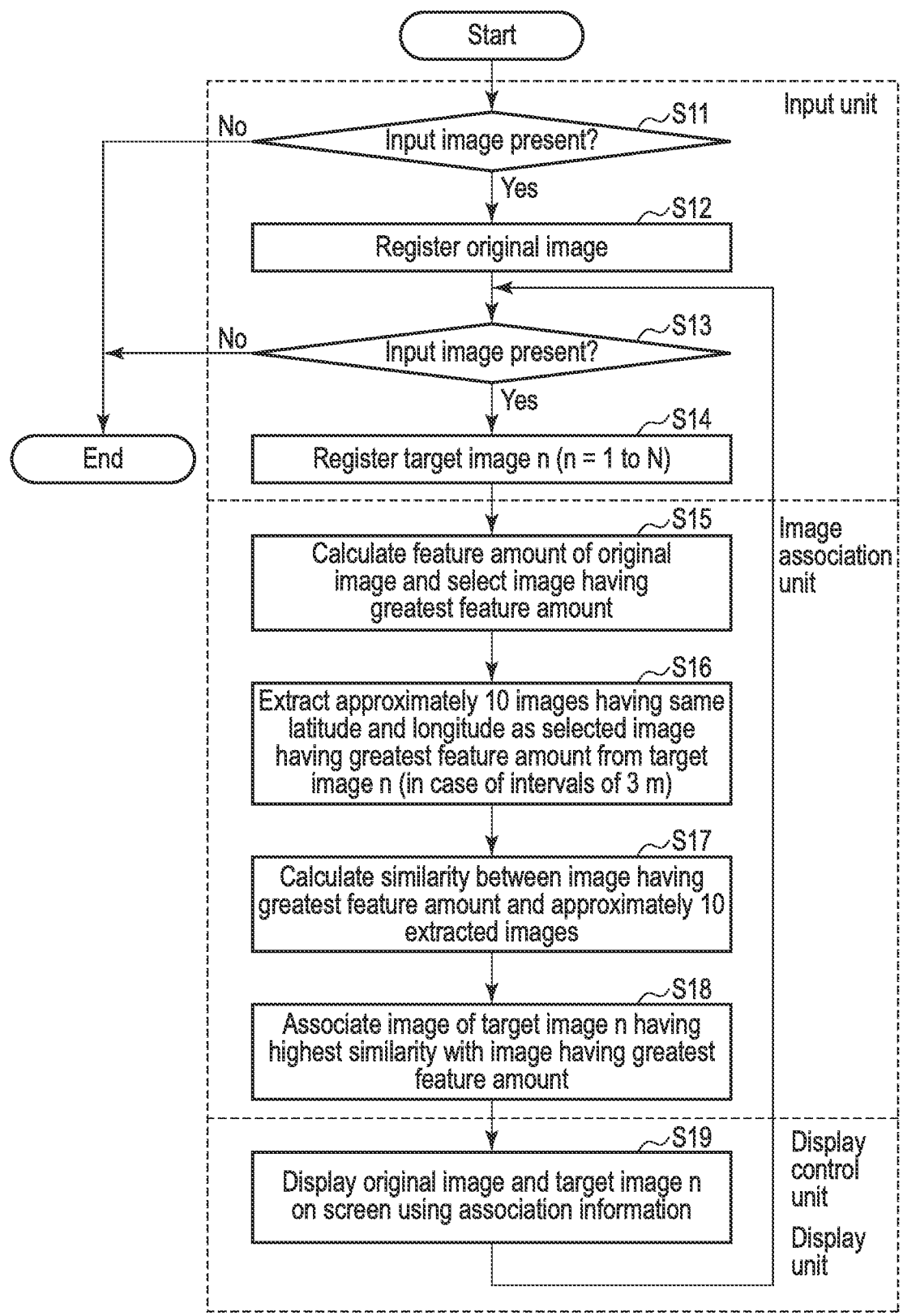
F I G. 5

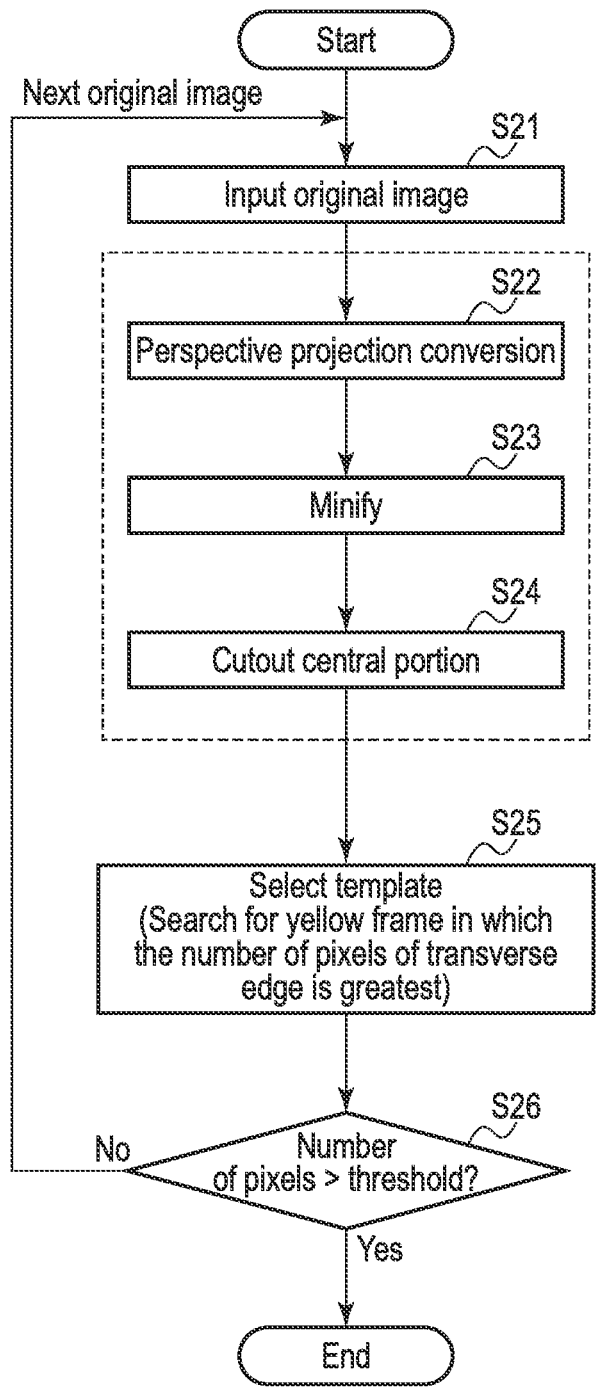
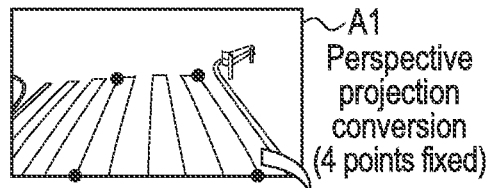
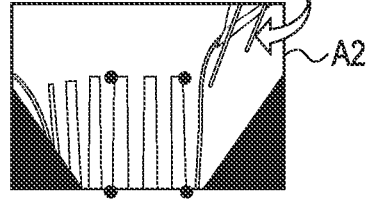
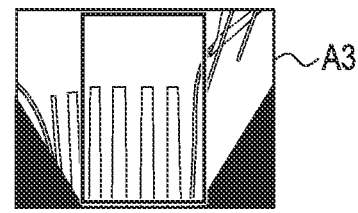
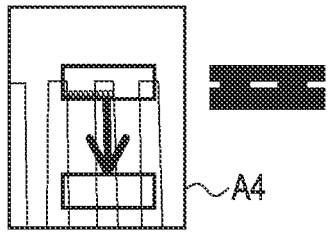
F I G. 6A
F I G. 6B

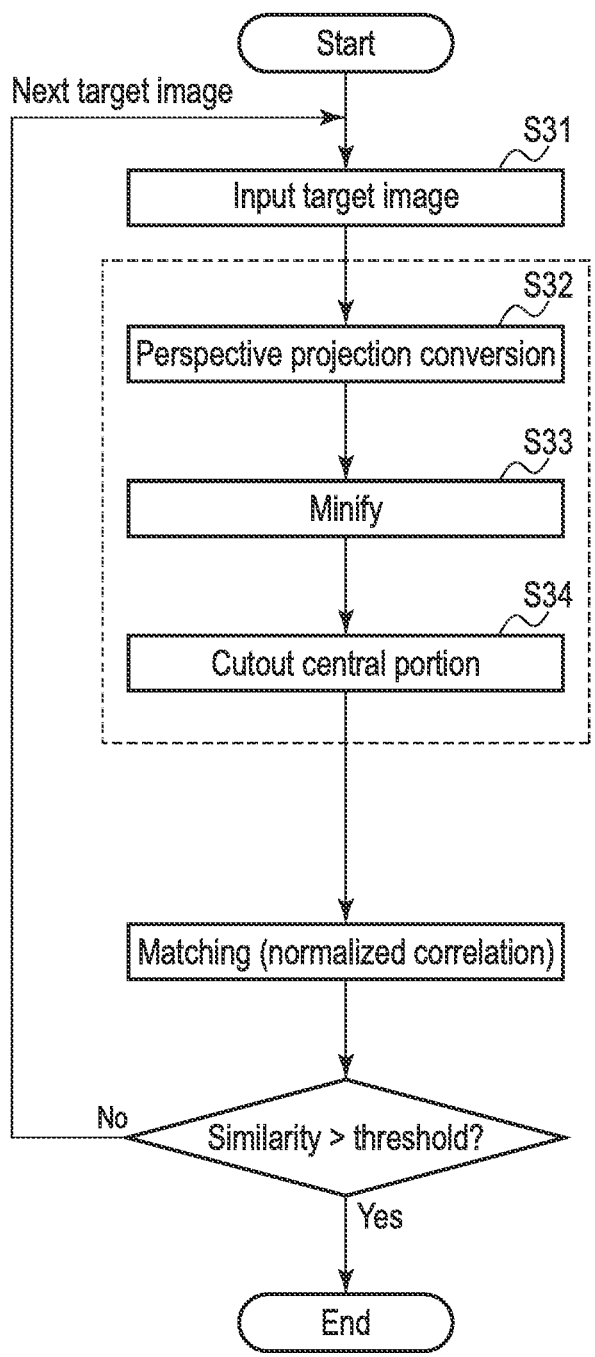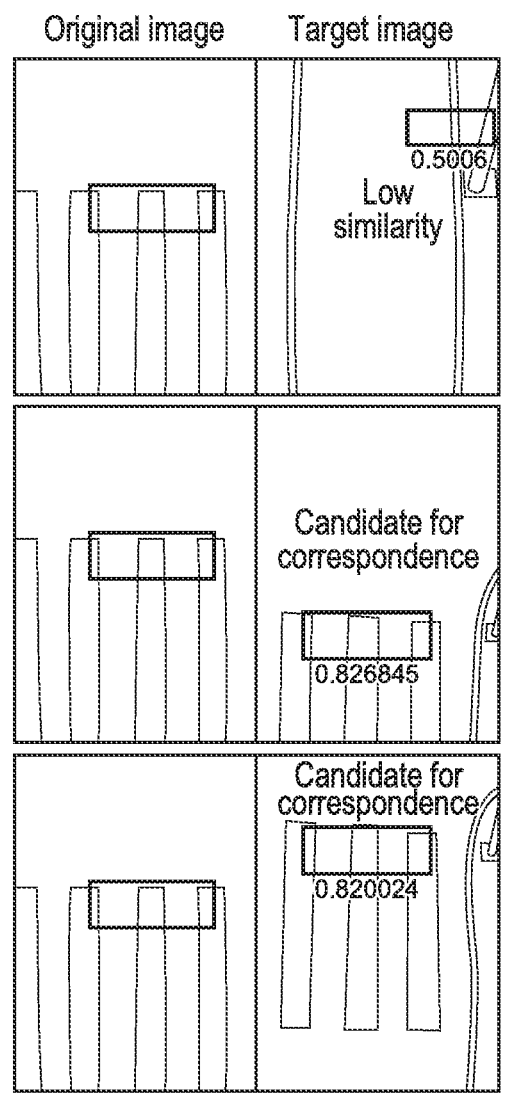
FIG. 7A
FIG. 7B

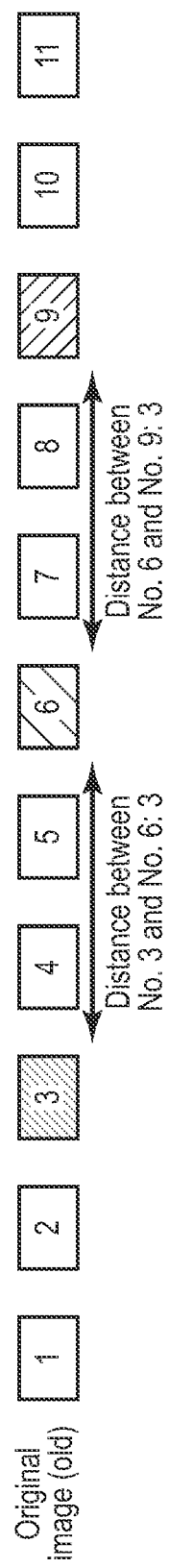
FIG. 9A
FIG. 9B

| Target image | 1 | 2 | 3 | 4 | 5 | 6 | 7 | 8 | 9 | 10 | 11 |
|---|---|---|---|---|---|---|---|---|---|---|---|
| Similarity to original image No. 3 | 5 points | 2 points | 3 points | 8 points | 1 point | — | — | — | — | — | — |
| Similarity to original image No. 6 | — | — | — | 10 points | 2 points | 3 points | 10 points | 1 point | — | — | — |
| Similarity to original image No. 9 | — | — | — | — | — | — | 1 point | 6 points | 3 points | 12 points | 8 points |

F I G. 10

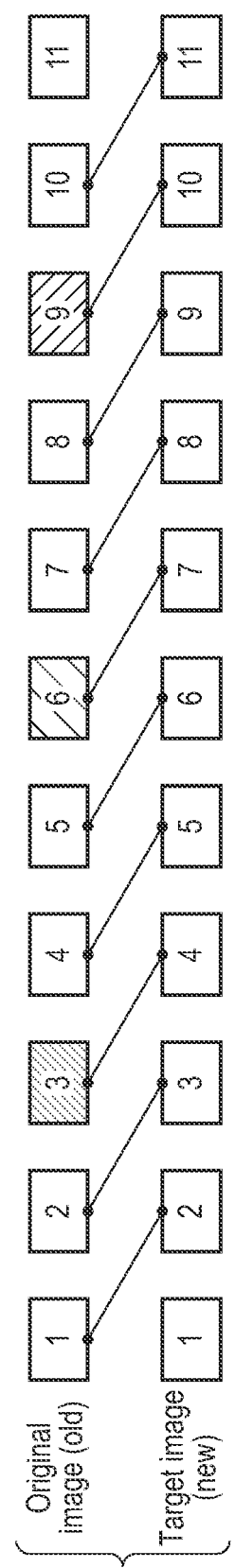
F I G. 11

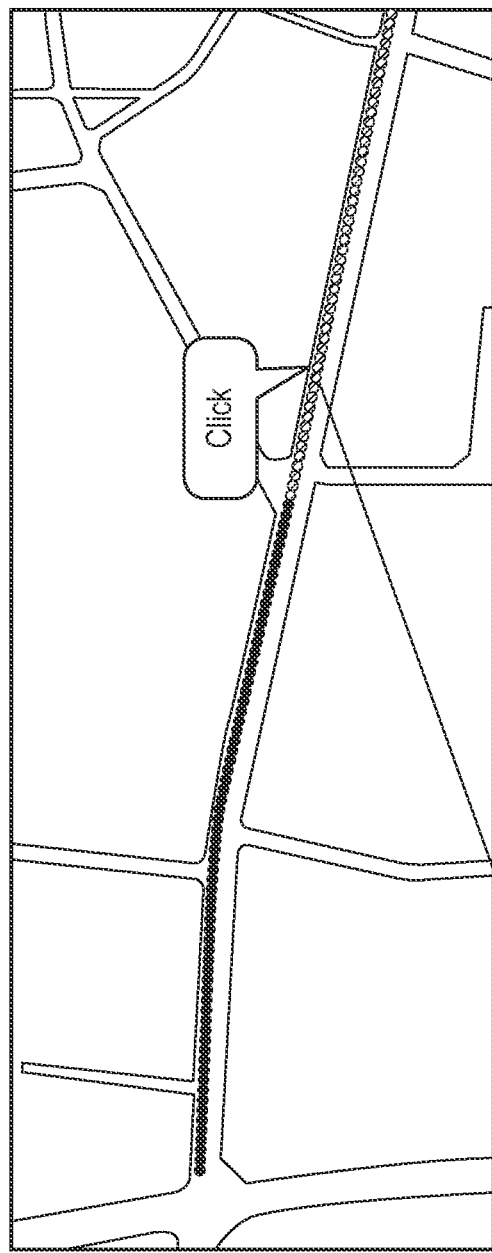
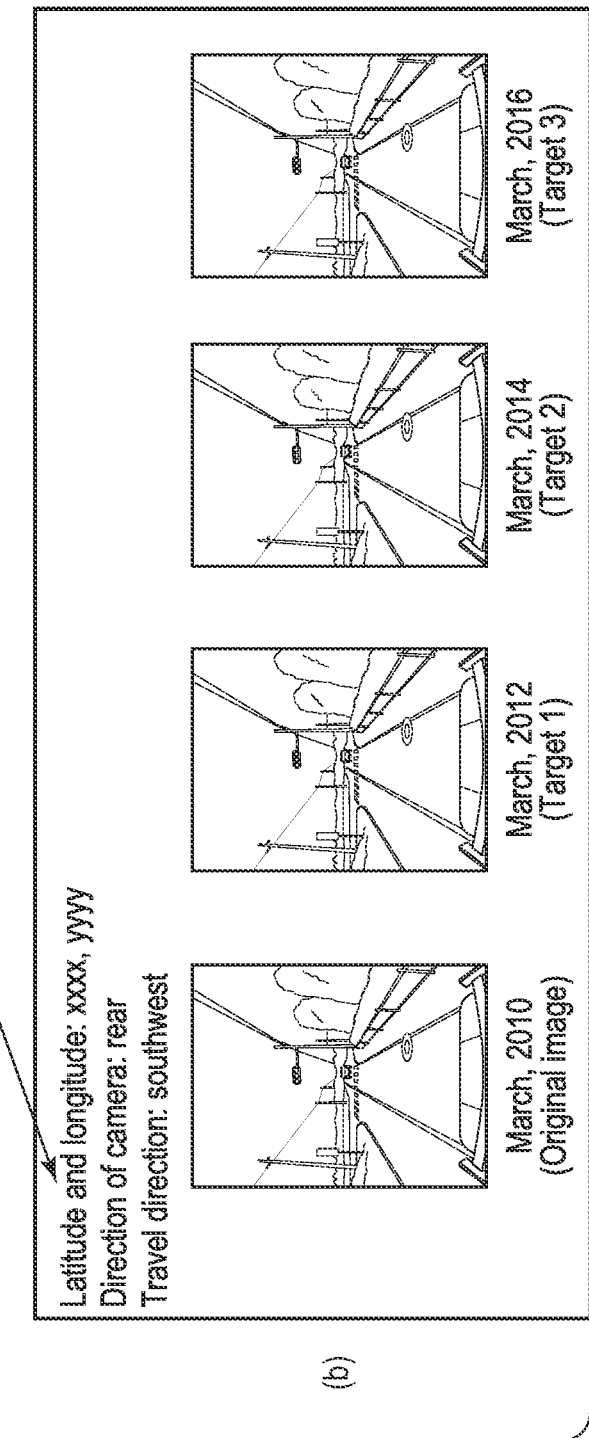
F I G. 13

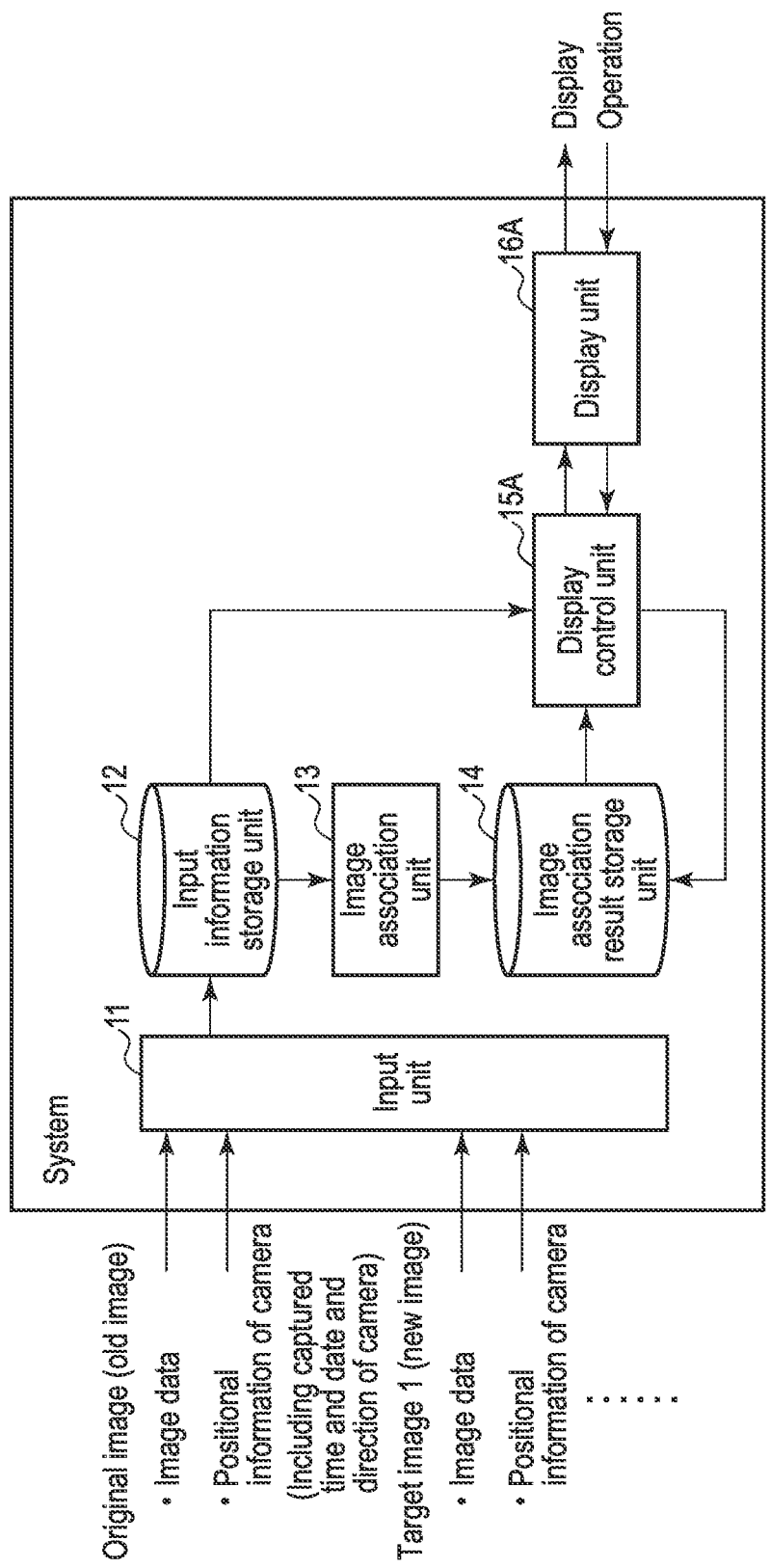
F I G. 14

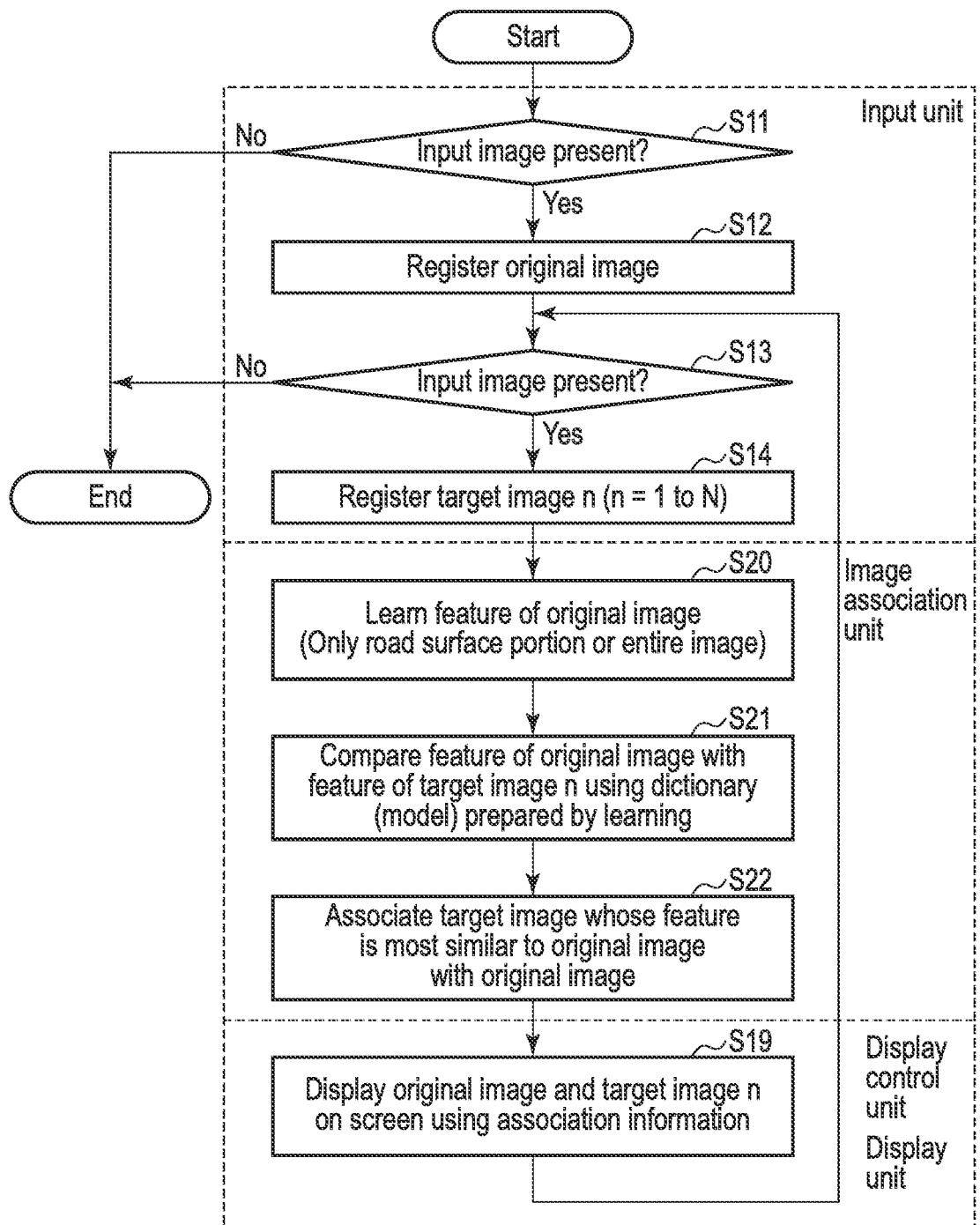
F I G. 17

ROAD SURFACE MANAGEMENT SYSTEM AND ROAD SURFACE MANAGEMENT METHOD THEREOF

CROSS-REFERENCE TO RELATED APPLICATIONS

This application is based upon and claims the benefit of priority from Japanese Patent Application No. 2019-193764, filed Oct. 24, 2019, the entire contents of which are incorporated herein by reference.

FIELD

Embodiments described herein relate generally to a road surface management system and a road surface management method thereof.

BACKGROUND

In recent years, a camera comprising a global positioning system (GPS) function which can, every time an image is captured, obtain the location information of the place has become widespread. Thus, an image to which location information is added can be easily obtained. For example, in a case where a road surface is captured by a camera comprising a GPS function, an image data of the road surface with location information can be obtained. In a road surface management system, the following use is considered. For example, a road surface is captured at the same spot by a camera comprising a GPS function at regular intervals. The secular change is observed by comparing the old and new images.

However, a camera comprising a GPS function has the following problem when it is used. Even if images at the same spot are to be extracted based on the location information obtained by the GPS to compare old and new images at the same spot, the images at the same spot cannot be extracted with high accuracy because of a measurement error of the GPS.

In a case where the coordinates of old and new images are integrated, a method which enables the effective acquisition of corresponding points between the old and new images with high coincidence is suggested. In this method, a sufficient number of feature points are automatically detected from a plurality of frame images of a moving image. The feature points are automatically pursued between the frames. In this manner, CV value data indicating the camera position and rotation angle of the moving image is obtained. Thus, the coordinates of the images are integrated. The feature of the method is as follows. Even in a case where the camera, the weather, the capturing condition or the direction of the observing point differs, corresponding points between old and new images can be obtained without an effect caused by the differences. The images can be expressed in the same three-dimensional coordinate system. However, this method presupposes the automatic detection of a sufficient number of feature points.

BRIEF DESCRIPTION OF THE DRAWINGS

FIG. 3A, FIG. 3B and FIG. 3C are conceptual diagrams showing the contents of a process for extracting old and new images at the same spot by images in the system shown in FIG. 1.

FIG. 5 is a flowchart showing the flow of the entire process of the first implementation example shown in FIG. 4.

FIG. 6A and FIG. 6B are a flowchart showing the flow of a process for calculating the feature amount of an original image and sample images in the first implementation example shown in FIG. 4.

FIG. 7A and FIG. 7B are a flowchart showing the flow of a process for associating images at the same spot with each other from the similarity of images and sample images in the first implementation example shown in FIG. 4.

FIG. 9A and FIG. 9B are a conceptual diagram showing a processing example in a case where a plurality of images having the same similarity are present in accordance with the processing flow shown in FIG. 8.

FIG. 10 is a diagram showing an example in which the similarity between an original image and a target image is calculated in the processing example shown in FIG. 9A and FIG. 9B.

FIG. 11 is a conceptual diagram showing the result of association at the same spot in the processing example shown in FIG. 9A and FIG. 9B.

FIG. 13 is diagrams showing a screen display example displaying the locations of the collected images and the images in the first implementation example shown in FIG. 4.

FIG. 14 is a block diagram showing a functional block configuration according to the second implementation example of the system shown in FIG. 1.

FIG. 17 is a flowchart showing another example regarding a method for realizing the calculation of the similarity of old and new images in the image association process shown in FIG. 5.

DETAILED DESCRIPTION

Figure 1:
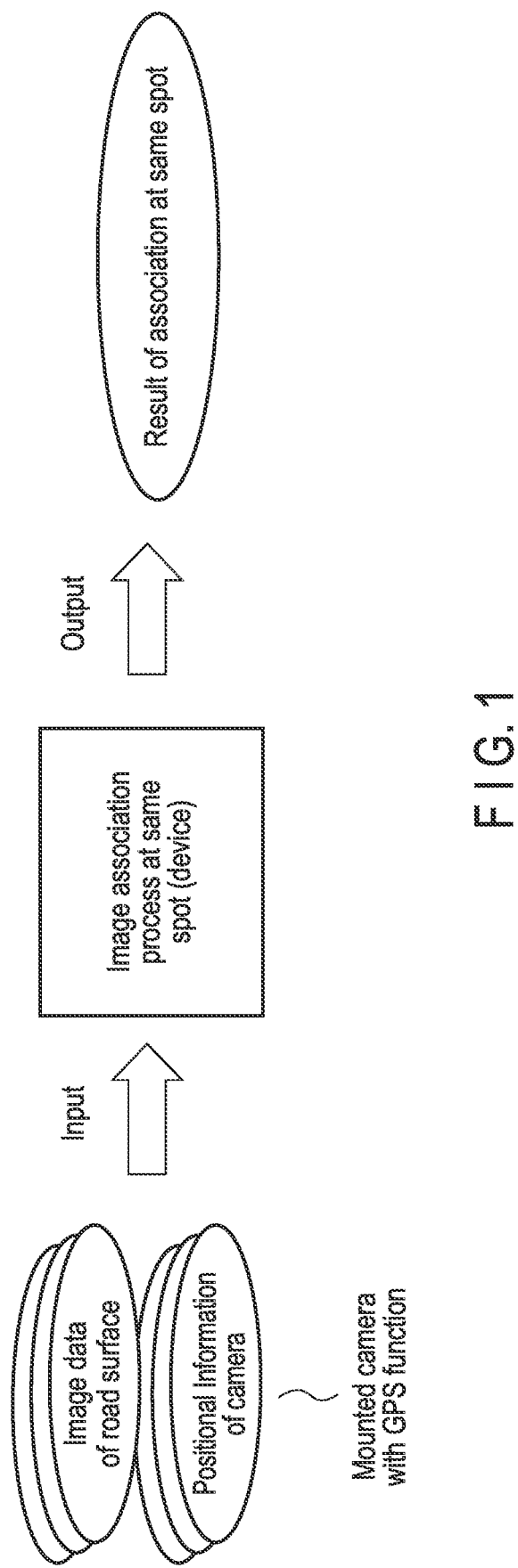
FIG. 1 is a block diagram showing the general structure of a road surface management system according to an embodiment.

Embodiments will be described hereinafter with reference to the accompanying drawings.

In general, according to one embodiment, a road surface management system inputs image data of road surface and capturing information of each of the image data of the road surface and registers them in a first registration unit. The image data of the road surface are collected by repeatedly capturing a same route at predetermined distance or time intervals with an on-board camera mounted on a road traveling body and comprising a function for obtaining the capturing information. The capturing information includes information of a location and time at time of capturing. The road surface management system selects old and new images at a same spot from the registered image data of road surface, performs an association process, registers a result of the association process in a second registration unit, extracts an original image which is an old image at an arbitrary spot and a target image which is a new image associated with the original image from the first registration unit based on the registered result of the association process, and outputs the original image and the target image.

In the following explanation, the disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In the specification and drawings, the same elements as those described in connection with preceding drawings may be denoted by like reference numbers, and detailed description thereof is omitted unless necessary.

EMBODIMENTS

Figure 2A:
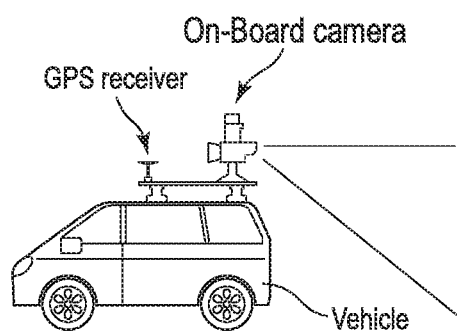
FIG. 2A and FIG. 2B are diagrams showing an image data of road surface collecting vehicle used in the system shown in FIG. 1 and a group of captured image data of the road surface.
Figure 2B:
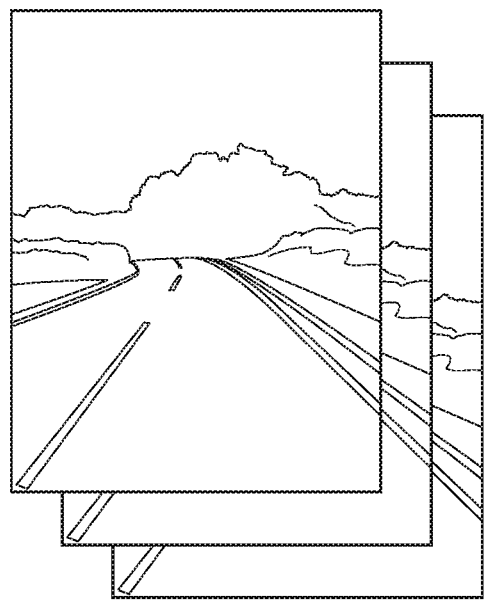

FIG. 1 is a block diagram showing the general structure of a road surface management system according to an embodiment. FIG. 2A and FIG. 2B are diagrams showing the image data of the road surface collecting vehicle used in the system shown in FIG. 1 and a group of captured image data of road surface. The road surface management system inputs a group of image data of road surface collected by repeatedly capturing the surface of the road of the same route at regular distances or time intervals as shown in FIG. 2B with a mounted on-board camera comprising a GPS function by a GPS receiver and an on-board camera mounted on a vehicle (the target on which the on-board camera is mounted is not limited to a vehicle and may be a traveling robot, and the mounted on-board camera may be a video camera having a GPS function) as shown in FIG. 2A, and also inputs the location of collection and the positional information of the mounted on-board camera of each image. The road surface management system accumulates the input group of image data of road surface, location of collection and the positional information of the mounted on-board camera, searches for image data of road surface at the same spot, performs an association process, outputs the result of association of the same spot of the image data of the road surface, and in response to a request, extracts old and new image data of road surface at an arbitrary spot and displays the images such that the images are compared with each other.

As an image capturing condition of the above mounted on-board camera, the road surface management system obtains a moving image or still images successively captured (for example, 15 images per second or at intervals of several meters). The mounted on-board camera faces the front or rear and obliquely captures a road surface from the above (excluding the right above). The location information obtained by the GPS receiver is associated with an image.

FIG. 3A, FIG. 3B and FIG. 3C are conceptual diagrams showing the contents of a process for extracting old and new images at the same spot by images in the system shown in FIG. 1. FIG. 3A shows a general method for associating an original (old) image with a target (new) image based on the information of latitude and longitude of each image obtained by an on-board camera comprising a GPS function. Each of FIG. 3B and FIG. 3C shows a method according to the present embodiment. FIG. 3B shows that an original image having a great feature amount is specified from a group of original images, and a group of target images having location information which is substantially the same as the location information of the specified original image is extracted. FIG. 3C shows that the feature amount of each of the original image specified in FIG. 3B and the images of the extracted group of target images is calculated, and the original image and a target image having the same feature amount are associated with each other.

In the general method for associating images based on the information of latitude and longitude of each image, as shown in FIG. 3A, images of different places may be associated with each other because of an error of the GPS. In this example, original image 3 showing pedestrian crossing 1 of original images is associated with target image 6 deviating from image 4 showing pedestrian crossing 1 of target images. In the present embodiment, firstly, as shown in FIG. 3B, an original image (in this example, image 3 showing pedestrian crossing 1) having a great feature amount is specified from a group of original images, and group 1-11 of target images having location information which is substantially the same as the location information of the specified original image 3 is extracted. Subsequently, as shown in FIG. 3C, the feature amount of each of the specified original image 3 and the images of the extracted group 1-11 of target images is calculated. Original image 3 and target image 4 having the same feature amount are associated with each other. Since a group of original images and a group of target images are captured at regular distance intervals, old and new images at the same spot can be extracted with high accuracy by carrying out association in the same arrangement as a plurality of association images based on the feature amount.

First Implementation Example

Figure 4:
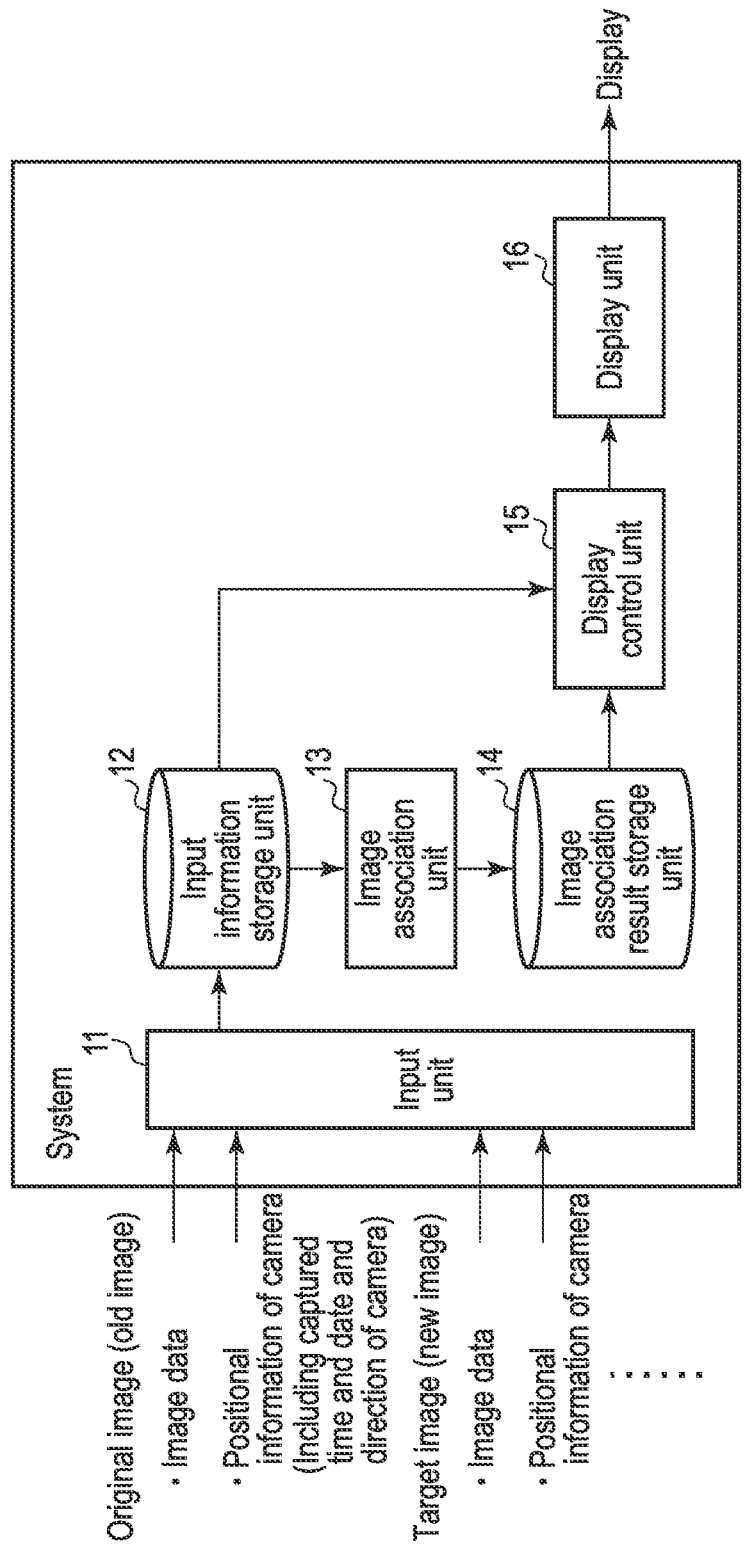
FIG. 4 is a block diagram showing a functional block configuration according to the first implementation example of the system shown in FIG. 1.

FIG. 4 is a block diagram showing a functional block configuration according to the first implementation example of the system shown in FIG. 1.

The road surface management system of the first implementation example shown in FIG. 4 comprises an input unit 11, an input information storage unit 12, an image association unit 13, an image association result storage unit 14, a display control unit 15 and a display unit 16. This system stores, in the input information storage unit 12, the image data of each original image (old image) and each target image (new image) input by the input unit 11, and on-board camera location information (including the captured time and date, and the direction of the on-board camera). The image association unit 13 performs an association process for images at the same spot or candidates for such images, using the location information of the old and new images stored in the input information storage unit 12 and the features of the images. The image association unit 13 stores the result of the association process in the result storage unit 14. The display control unit 15 extracts a target image associated with an arbitrary original image based on the images and image association data stored in the input image storage unit 12 and the image association result storage unit 14, and displays the result of the extraction on the screen of the display unit 16 such that the images are compared with each other.

FIG. 5 is a flowchart showing the flow of the entire process of the first implementation example shown in FIG. 4. In FIG. 5, when an input image is present in the input unit 11 (step S11), the input image is registered in the input information storage unit 12 as an original image (step S12). Subsequently, when an input image is present in the input unit 11 $n$ (=1 to N) times (step S13), the input images are registered in the input information storage unit 12 as target image n (step S14). After the registration of the images, in the image association unit 13, the feature amount of the original image is calculated, and an image having the greatest feature amount is selected (step S15). Approximately 10 images having the same latitude and longitude as the selected image having the greatest feature amount are extracted from target image n (in the case of intervals of 3 meters) (step S16). Subsequently, the similarity between the image having the greatest feature and each of the approximately 10 extracted images is calculated (step S17). Subsequently, an image of target image n having the highest similarity is associated with the image having the greatest feature amount (step S18). In the display control unit 15 and the display unit 16, the original image and target image n are displayed on the screen, using association information (step S19).

FIG. 6A and FIG. 6B show the flow of a process for calculating the feature amount of the original image in the first implementation example shown in FIG. 4.

FIG. 6A is a flowchart. FIG. 6B shows a sample image in each processing stage. In FIG. 6A, when an original image is input (step S21), perspective projection conversion is applied (step S22, sample image A1). The image is minified (step S23, sample image A2). The central portion is cut out as the feature portion of the original image (step S24, sample image A3). Subsequently, as shown in sample image A4 of FIG. 6B, a template for searching for a range in which the number (amount) of pixels of the transverse edge is the greatest is selected (step S25). Whether or not the number of pixels is greater than a threshold is determined (step S26). When the number of pixels is greater than the threshold, the number of pixels of the feature portion is output as the feature amount. When the number of pixels is not greater than the threshold, the next original image is input, and the calculation process of the feature amount is performed. For a process for extracting an original image having a great feature amount and calculating the feature amount, characterized images of a pedestrian crossing, a stop line, a joint of a bridge, a manhole, etc., may be automatically extracted in advance, using, for example, AI, and the feature amounts of the image data of the road surface may be calculated. An original image having the greatest feature amount among the calculated feature amounts is extracted.

FIG. 7A and FIG. 7B show the flow of a process for associating images at the same spot with each other from the similarity of the images in the first implementation example shown in FIG. 4. FIG. 7A is a flowchart. FIG. 7B shows sample images in a matching process. In FIG. 7A, when target images having location information which is substantially the same as an original image (in consideration of image acquisition intervals, approximately 10 target images) are input (step S31), perspective projection conversion is applied (step S32). The images are minified (step S33). The central portion of each image is cut out as the feature portion of the target image (step S34). Here, as shown in FIG. 7B, the similarity is calculated by comparing the feature portion of the original image with the feature portion of the target image for matching by normalized correlation (step S35). Whether or not the similarity exceeds a threshold is determined (step S36). When the similarity does not exceed the threshold, the next target image is input, and the feature portion is cut out, and the similarity to the feature portion of the original image is calculated. When the similarity exceeds the threshold, the target image is associated as an image at the same spot as the original image.

Figure 8:
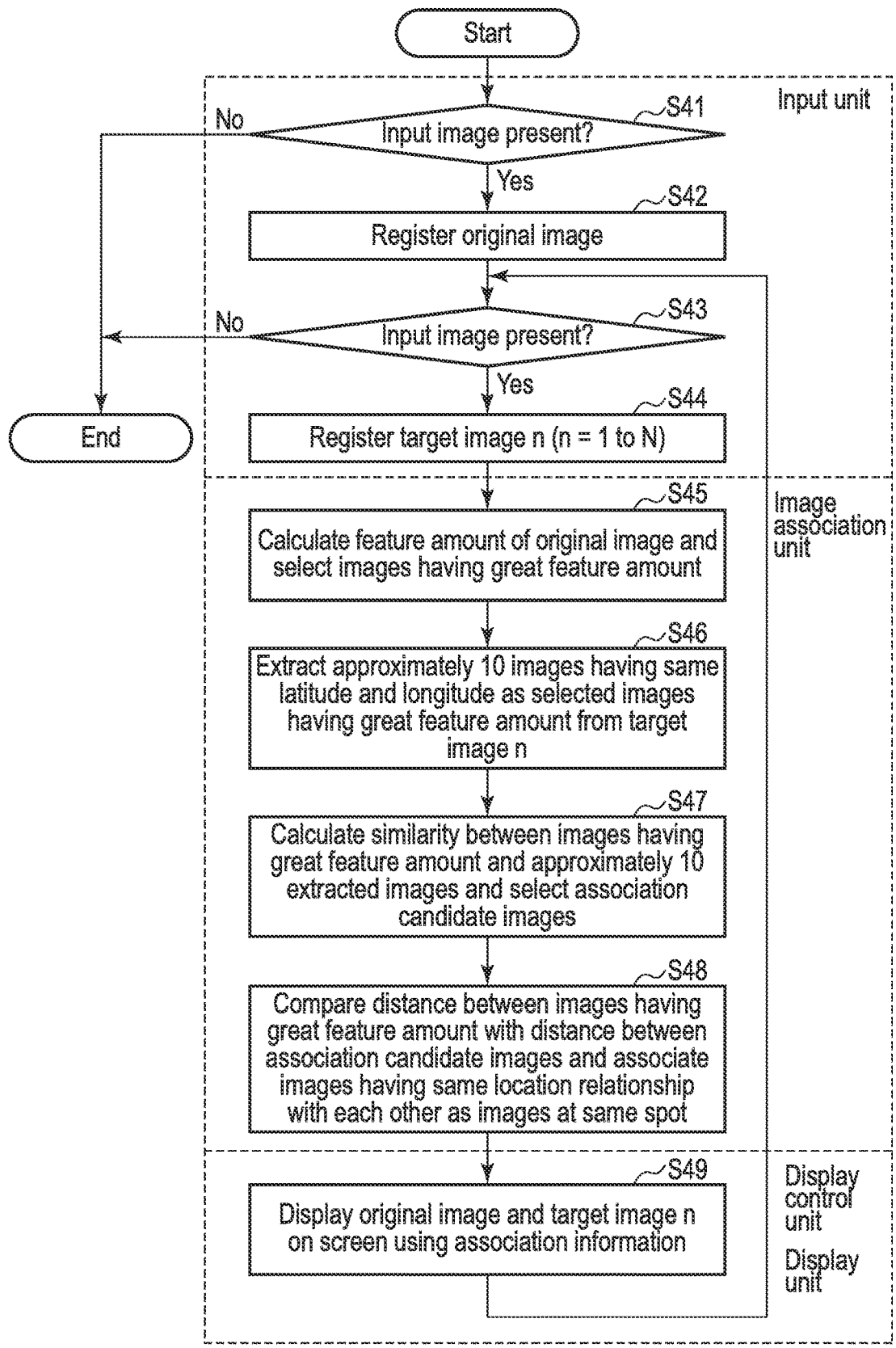
FIG. 8 is a flowchart showing the flow of a process for associating images at the same spot with each other in a case where a plurality of images having the same similarity are present in the first implementation example shown in FIG. 4.

FIG. 8 is a flowchart showing the flow of a process for associating images at the same spot with each other in a case where a plurality of images having the same similarity are present in the first implementation example shown in FIG. 4. In FIG. 8, when an input image is present in the input unit 11 (step S41), the input image is registered in the input information storage unit 12 as an original image (step S42). Subsequently, when an input image is present in the input unit 11 $n$ (=1 to N) times (step S43), the input images are registered in the input information storage unit 12 as target image n (step S44). After the registration of the images, in the image association unit 13, the feature amount of the original image is calculated, and a plurality of images having a great feature amount are selected (step S45). Approximately 10 images having the same latitude and longitude as each of the selected image data are extracted from a target image data n (step S46). Subsequently, the similarity between each image having a great feature and each of the approximately 10 extracted images is calculated, and association candidate images are selected (step S47). Subsequently, the distance between the images having a great feature amount is compared with the distance between the association candidate images, and images having the same location relationship are associated with each other as images at the same spot (step S48). In the display control unit 15 and the display unit 16, the original image and target image n are displayed on the screen, using association information (step S49).

FIG. 9A and FIG. 9B are a conceptual diagram showing a processing example in a case where a plurality of images having the same similarity are present in accordance with the processing flow shown in FIG. 8. FIG. 9A shows an original (old) image.

FIG. 9B shows a target (new) image. FIG. 10 is a diagram showing an example in which the similarity between an original image and a target image is calculated in the processing example shown in FIG. 9A and FIG. 9B. FIG. 11 is a conceptual diagram showing the result of association at the same spot in the processing example shown in FIG. 9A and FIG. 9B.

Step 1: Firstly, an image having the greatest feature amount is extracted from the original image. Here, it is assumed that No. 6 is extracted.

Step 2: The similarity between No. 6 and target images is calculated (see FIG. 10).

Step 3: An image having a great feature amount (for example, greater than or equal to a threshold) is extracted from the original image. Here, it is assumed that No. 3 and No. 9 are extracted.

Step 4: Regarding No. 3 and No. 9, the similarity is calculated in the same manner as step 2 (see FIG. 10). An image having the highest similarity is determined as the association target. In this way, the association target of original image No. 3 is determined as target image No. 4. The association target of original image No. 9 is determined as target image No. 10.

Step 5: A target image corresponding to each original image is determined from the location relationships of original images No. 3, No. 6 and No. 9 (see FIG. 11).

In this way, in the image association unit 13, when a plurality of images having the same similarity are present, the similarity is calculated not only for an image having the greatest feature amount in the original image but also for a plurality of images having a great feature amount, and an association process is applied, and the image of the association destination is specified from the location relationships of the images having a great feature amount (the distance between frames and the number of frames). This process also improves the accuracy of the association process.

Figure 12:
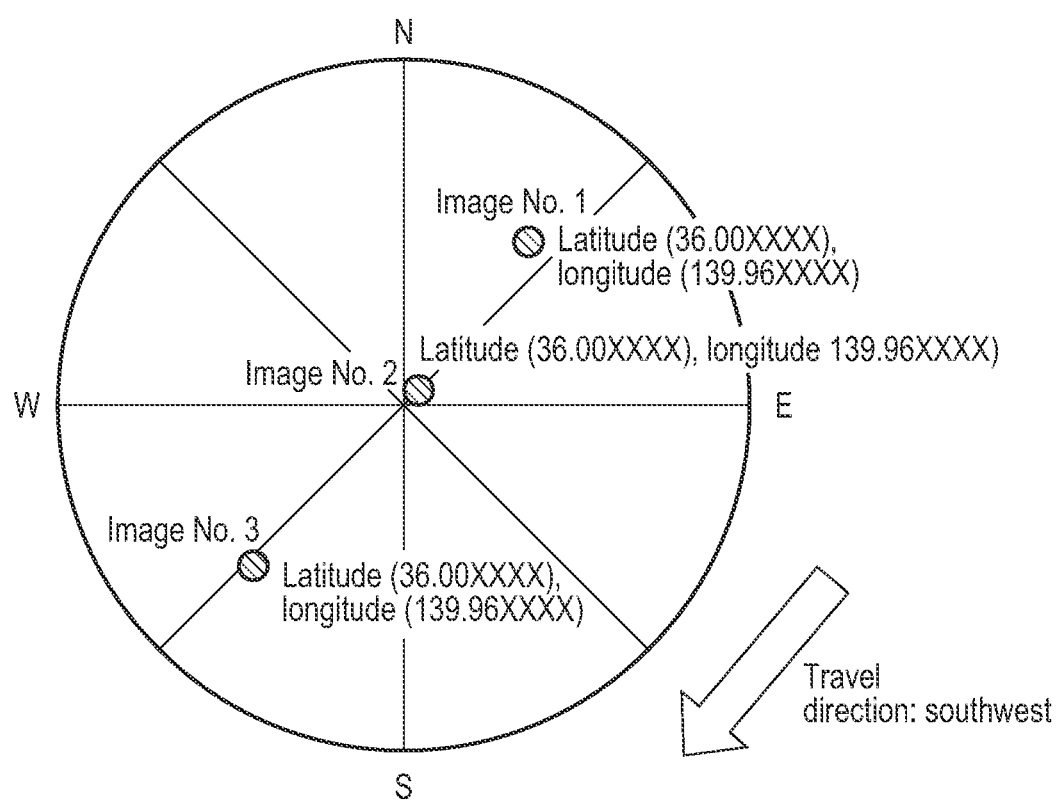
FIG. 12 is a conceptual diagram showing how images are associated with each other from the result of determination of a travel direction in the first implementation example shown in FIG. 4.

FIG. 12 is a conceptual diagram showing how images are associated with each other from the result of determination of a travel direction in the first implementation example shown in FIG. 4. FIG. 12 shows a function for automatically determining an approximate travel direction as a supplementary function of the image association unit 13. The travel direction determination function of the image association unit 13 of this system performs a travel direction determination process from the captured date and time and location information as information added to each image, adds travel direction information to each image, and stores the information in the image association result storage unit 14. In the determination of the travel direction, the travel direction is calculated from the difference in the information of latitude and longitude of a plurality of images (successive, intervals of one second, etc.). For example, the travel direction is classified into eight directions.

FIG. 13 is diagrams showing a screen display example displaying the locations of the collected images and the images in the first implementation example shown in FIG. 4. In FIG. 13, (a) shows map information indicating the locations at which the images are collected. In FIG. 13, (b) shows the images (original image and target images) at the clicked location. This screen display example is displayed when a user operates the screen (in other words, when a user clicks the applicable portion on the map). However, when location information is specified, a search for the images of the applicable portion may be conducted, and the images may be displayed.

Second Implementation Example

FIG. 14 is a block diagram showing a functional block configuration according to the second implementation example of the system shown in FIG. 1. In FIG. 14, the same portions as FIG. 4 are denoted by the same reference numbers and explanations thereof are omitted. Here, different portions are explained. The system shown in FIG. 14 comprises a feedback function in a display control unit 15A and a display unit 16A. The feedback function of the display unit 16A is a function for, when a user selects and registers images at the same spot by operating the screen, registering the information in the storage unit 14 which stores the result of association of old and new images. This function is used when the above image association process is not appropriately conducted or when a plurality of association candidates are extracted.

Figure 15:
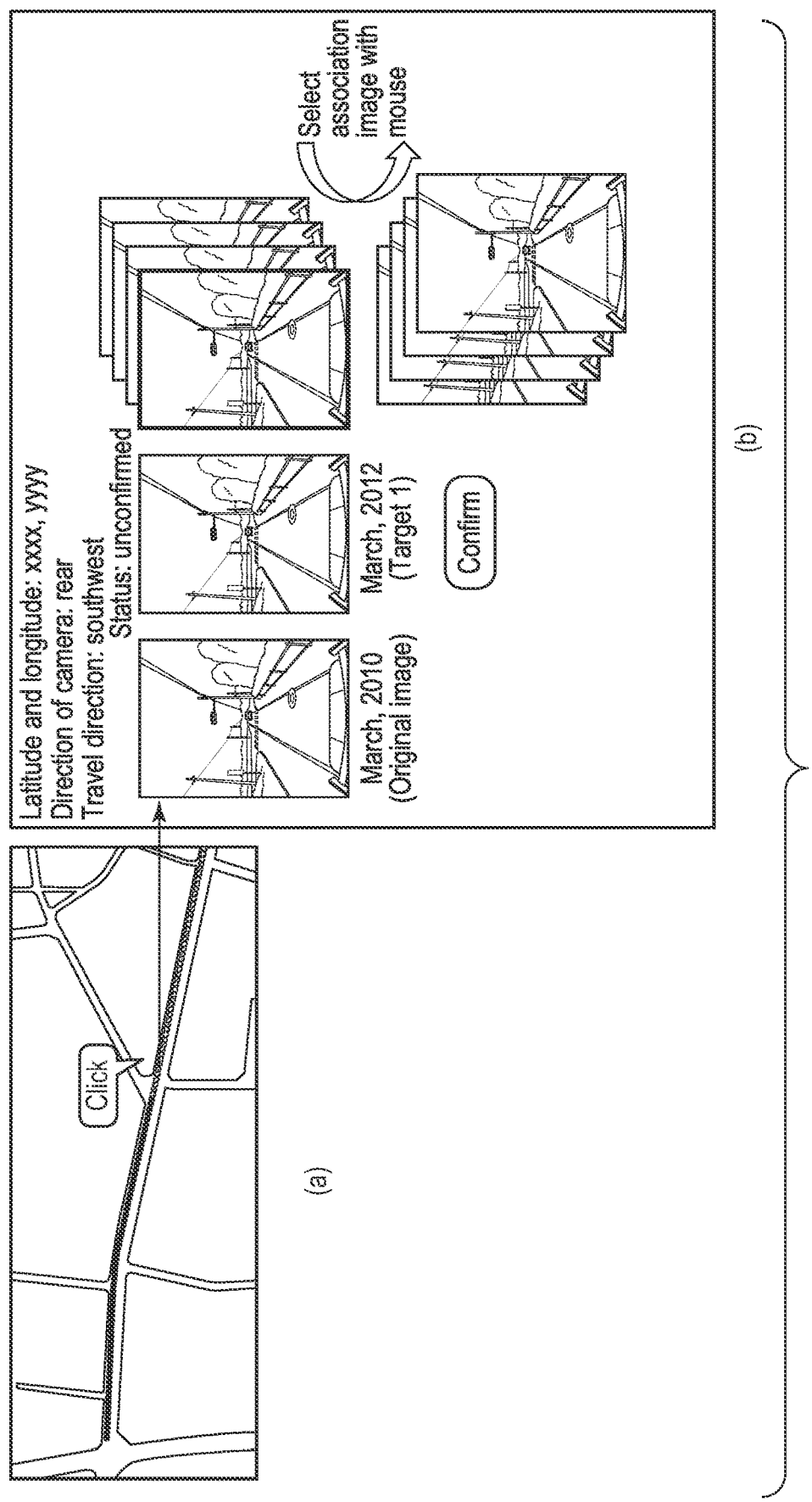
FIG. 15 is diagrams showing a screen display example in which the status is unconfirmed in the second implementation example shown in FIG. 14.
Figure 16:
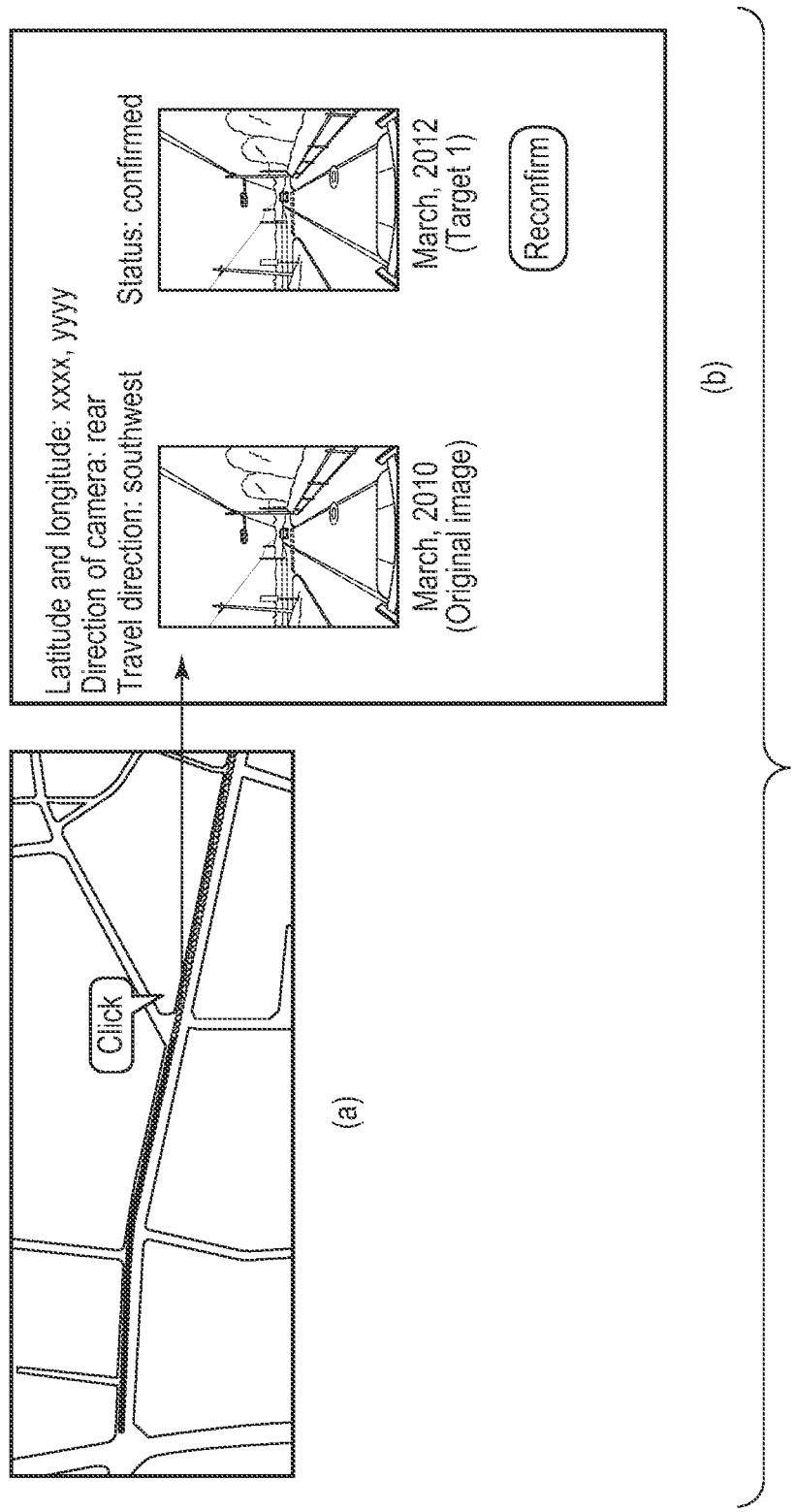
FIG. 16 is diagrams showing a screen display example in which the status is confirmed in the second implementation example shown in FIG. 14.

FIG. 15 is diagrams showing a screen display example in which the status is unconfirmed in the second implementation example shown in FIG. 14. In FIG. 15, (a) shows map information indicating the locations at which images are collected. In FIG. 15, (b) shows the images (original image and target images) at the clicked location. FIG. 16 is diagrams showing a screen display example in which the status is confirmed in the second implementation example shown in FIG. 14. In FIG. 16, (a) shows map information indicating the locations at which images are collected. In FIG. 16, (b) shows the images (original image and target images) at the clicked location. When an image association process is not appropriately conducted or when a plurality of association candidates are extracted, the status is registered in the result of association as an unconfirmed status. As shown in FIG. 15, the original image at the location determined as an unconfirmed status and target images which are association candidates are presented in series to encourage the user to select and specify an image. When the user determines that the image is an image at the same location as the original image, the result of association of the image in which the status is unconfirmed stored in the image association result storage unit 14 is corrected (reflected) such that the target image is associated with the original image. In this manner, the above status is changed to a confirmed status. As shown in FIG. 16, the original image and the target image at the location can be displayed as a confirmed status such that the images are compared with each other.

In the case of successive images captured at regular intervals (intervals of several meters), by one selection made by the user, a series of images before and after the selection are automatically associated.

FIG. 17 is a flowchart showing another example regarding a method for realizing the calculation of the similarity of old and new images in the process for associating images with each other in FIG. 5. In FIG. 17, the same portions as FIG. 5 are denoted by the same reference numbers. Here, different portions are explained.

In FIG. 17, the image association processing unit adopts a method for comparing images with each other regarding only a comparative road surface portion or the entire image including a background to calculate the similarity while using deep learning for the calculation of the similarity of old and new images, and associating an old image with a new image based on the result of calculation. Specifically, the feature of the original image is learned (only a road surface portion or the entire image) (step S20). Using a dictionary (model) prepared by learning, the feature of the original image is compared with the feature of target image n (step S21). The target image whose feature is the most similar to the original image is associated with the original image (step S22). The process is transferred to the display control unit and the display unit. Thus, even in a method for using deep learning for the calculation of the similarity of old and new images, an image of target image n having the highest similarity can be associated with an image having a great feature amount.

As described above, according to the road surface management system of the present implementation example, the user can easily confirm the same spot from the display contents of image data of road surface by the feedback function and easily know the change or degradation in the situation of the road surface by the comparative display.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A road surface management system comprising:
an input unit which inputs image data of road surface and capturing information of each of the image data of the road surface, the image data of the road surface being collected by repeatedly capturing a same route at predetermined distance or time intervals with a camera mounted on a road traveling body and comprising a function for obtaining the capturing information, the capturing information including information of a location and time at time of capturing;
a first registration unit which registers the image data of the road surface and the capturing information input from the input unit;
an association processing unit which selects old and new images at a same spot from the image data of the road surface registered in the first registration unit and performs an association process;
a second registration unit which registers a result of the association process of the association processing unit; and
an output unit which extracts an original image which is an old image at an arbitrary spot and a target image which is a new image associated with the original image from the first registration unit based on the result of the association process registered in the second registration unit, and outputs the original image and the target image, wherein
the association processing unit extracts, from the first registration unit, of the original image, an original image having a great feature amount, and a group of target images having substantially same location information as location information of the original image, calculates a feature amount of each of the original image and images of the group of target images, associates the original image and a target image having a substantially same feature amount with each other, and associates another original image with a target image in accordance with a result of association based on the feature amount.

2. The road surface management system of claim 1, wherein
the association processing unit calculates the feature amount of the original image to select an image having the greatest feature amount, extracts a plurality of target images having latitude and longitude substantially same as the selected image having the greatest feature amount, calculates similarity between the selected original image and the extracted target images, and associates a target image having the highest similarity with the selected original image.

3. The road surface management system of claim 1, wherein
the association processing unit calculates the feature amount of the original image to select a plurality of images having a great feature amount, extracts a plurality of target images having latitude and longitude substantially same as each of the selected original images having a great feature amount, calculates similarity to the extracted target images with respect to the selected original images to select association candidate images, compares a distance between the original images having a great feature amount with a distance between the association candidate target images, associates images having a same location relationship with each other as images at a same spot.

4. The road surface management system of claim 1, wherein
the association processing unit applies perspective projection conversion to an input image, minifies the image of the result of the conversion, cuts out a central portion of the minified image as a feature portion of the original image, selects a template for searching for a range in which the number of pixels of a transverse edge is greatest, and outputs the number of pixels of the feature portion as the feature amount when the number of pixels based on the template is greater than a threshold.

5. The road surface management system of claim 2, wherein the association processing unit calculates the similarity by comparing a feature portion of the original image with a feature portion of the target image for matching by normalized correlation.

6. The road surface management system of claim 1, wherein
the association processing unit performs a travel direction determination process from the information of the location and time at the time of capturing included in the capturing information, and adds travel direction information to each image.

7. The road surface management system of claim 1, wherein
the output unit extracts a target image associated with an original image at an arbitrary location from the first registration unit, and displays a result of the extraction on a display screen such that the images are compared with each other.

8. The road surface management system of claim 7, further comprising:
a feedback unit which reflects, when a user instructs selection of an image at the same spot by a screen operation from the comparative display of the display screen, this information on registered content of the second registration unit which registers a result of association of old and new images.

9. A road surface management method of a road surface image management system comprising:
an input unit which inputs image data of road surface and capturing information of each of the images of the road surface, the image data of the road surface being collected by repeatedly capturing a same route at predetermined distance or time intervals with a camera mounted on a road traveling body and comprising a function for obtaining the capturing information, the capturing information including information of a location and time at time of capturing;
a first registration unit which registers the image data of the road surface and the capturing information input from the input unit;
an association processing unit which selects old and new images at a same spot from the image data of the road surface registered in the first registration unit and performs an association process;
a second registration unit which registers a result of the association process of the association processing unit; and
an output unit which extracts an original image which is an old image at an arbitrary spot and a target image which is a new image associated with the original image from the first registration unit based on the result of the association process registered in the second registration unit, and outputs the original image and the target image, the method being used for the road surface management system and comprising:
- extracting, of the original image, an original image having a great feature amount, and a group of target images having substantially same location information as location information of the original image;
- calculating a feature amount of each of the original image and images of the group of target images;
- associating the original image and a target image having a substantially same feature amount with each other; and
- associating another original image with a target image in accordance with a result of association based on the feature amount.

* * * * *